US008651427B1

(12) United States Patent
Malachowski et al.

(10) Patent No.: US 8,651,427 B1
(45) Date of Patent: *Feb. 18, 2014

(54) WING TIP DEVICE WITH RECESS IN SURFACE

(75) Inventors: Adam P. Malachowski, Lynnwood, WA (US); Stephen R. Chaney, Seattle, WA (US); Norman K. Ebner, Bellevue, WA (US); Stephen L. LeDoux, Everett, WA (US); Christopher A. Vegter, Bothell, WA (US)

(73) Assignee: The Boeing Company, Chicago, IL (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/411,941

(22) Filed: Mar. 5, 2012

Related U.S. Application Data

(63) Continuation-in-part of application No. 12/103,430, filed on Apr. 15, 2008, now Pat. No. 8,128,035.

(51) Int. Cl.
*B64C 3/58* (2006.01)
*B64C 23/06* (2006.01)

(52) U.S. Cl.
USPC .......................................... 244/199.4; 244/91

(58) Field of Classification Search
USPC ............. 244/130, 199.1, 199.2, 199.3, 199.4, 244/200, 200.1, 91; D12/345
See application file for complete search history.

(56) References Cited

U.S. PATENT DOCUMENTS

| 2,576,981 | A | * | 12/1951 | Vogt ................................. 244/91 |
| 4,108,403 | A | * | 8/1978 | Finch ........................... 244/199.2 |
| 4,205,810 | A | | 6/1980 | Ishimitsu |
| 4,595,160 | A | | 6/1986 | Santos |
| 4,714,215 | A | * | 12/1987 | Jupp et al. ................... 244/199.4 |
| 5,275,358 | A | | 1/1994 | Goldhammer et al. |
| 5,378,524 | A | | 1/1995 | Blood |
| 5,634,613 | A | * | 6/1997 | McCarthy ................... 244/199.1 |
| 6,474,604 | B1 | | 11/2002 | Carlow |
| 7,207,526 | B2 | * | 4/2007 | McCarthy ................... 244/199.4 |
| 7,497,403 | B2 | * | 3/2009 | McCarthy ................... 244/199.4 |

\* cited by examiner

*Primary Examiner* — Tien Dinh
*Assistant Examiner* — Michael Kreiner

(57) ABSTRACT

An aerodynamic lift structure includes a wing and at least one wing tip device at an outboard portion of the wing. A surface of each wing tip device has a recess that reduces flow impact at a junction of the wing and the wing tip device.

16 Claims, 7 Drawing Sheets

WING TIP DEVICE WITH RECESS IN SURFACE

This is a continuation-in-part of copending U.S. Ser. No. 12/103,430 filed 15 Apr. 2008, soon U.S. Pat. No. 8,128,035.

BACKGROUND

Winglets are used to reduce induced drag on aircraft wings. According to the "Trefftz plane theory" the induced drag depends only on the "spanload" and the trailing edge trace of the "lifting system" (i.e., the wing plus tip device), as viewed directly from the front or rear of the wing. The spanload is the distribution of aerodynamic load perpendicular to the trailing edge trace of the wing. Adding a winglet to a wing changes both the trailing edge trace (i.e., the "Trefftz-plane geometry") and the spanload. Adding such a device also changes the induced drag on the wing.

The winglet may be added to a wing by removing a tip of the wing and fastening the winglet to the remaining outboard portion. However, adding the winglet can create interference effects between the wing and the winglet. The interference effects can increase drag and/or reduce lift, which adversely affect aircraft performance.

It is desirable to reduce or eliminate the interference effects.

SUMMARY

According to an embodiment herein, an aerodynamic lift structure comprises a wing and at least one wing tip device at an outboard portion of the wing. A surface of each wing tip device has a recess that reduces flow interference effects at a junction of the wing and the wing tip device.

According to another embodiment herein, a wing tip device comprises a surface having a root and a tip, and a recess near the root. The recess has convex, concave, and convex portions in a chordwise direction.

According to another embodiment herein, a method comprises removing a tip of an aircraft wing, and fastening a wing tip device to an outboard portion of the wing. The wing tip device has a recess that reduces flow interference effects at a junction of the wing and the wing tip device.

These features and functions may be achieved independently in various embodiments or may be combined in other embodiments. Further details of the embodiments can be seen with reference to the following description and drawings.

DETAILED DESCRIPTION

Figure 1:
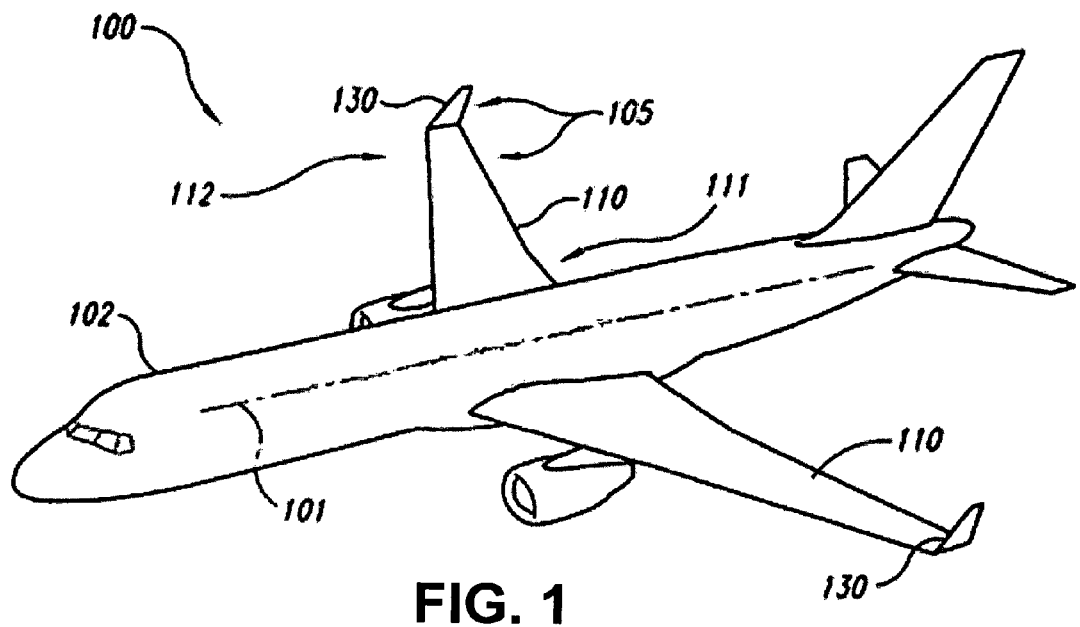
FIG. 1 is an illustration of an aircraft having wings and wingtip devices.

Reference is made to FIG. 1, which illustrates an aircraft 100 including a lift surface such as a wing 110 extending outwardly from a fuselage 102. The fuselage 102 may be aligned along a longitudinal axis 101.

The wing 110 has an inboard portion 111 that is joined to the fuselage 102. A winglet 130 is joined to an outboard portion 112 of the wing 110. The winglet 130 is a type of wing tip device.

Figure 2:
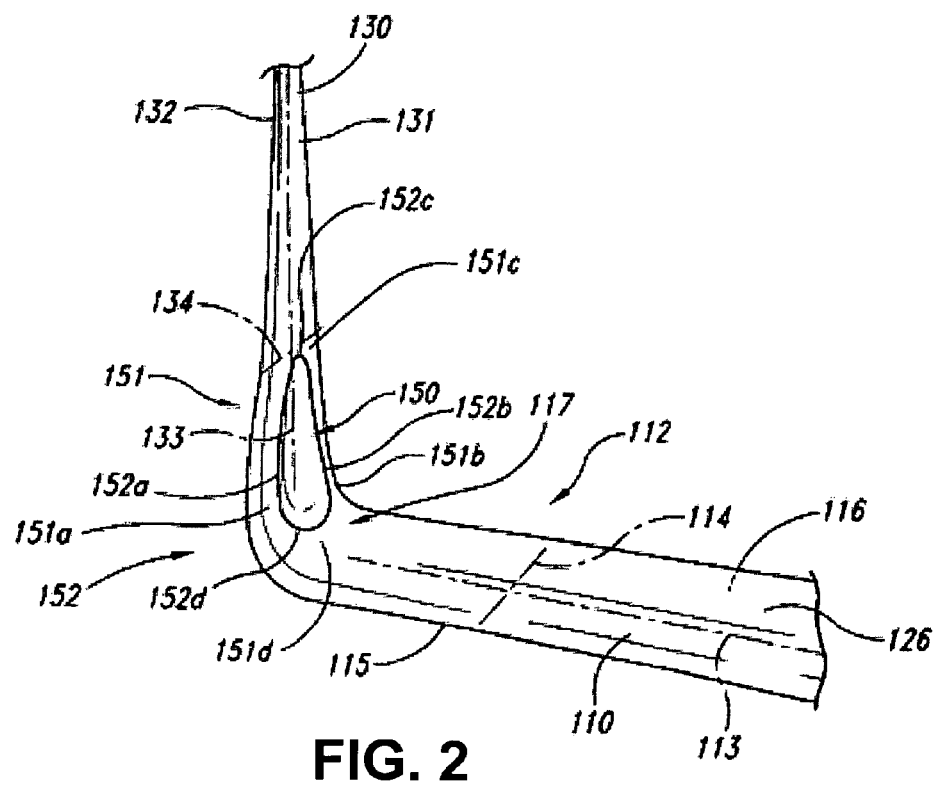
FIG. 2 is an illustration of an outboard wing portion and winglet having a recess.

Additional reference is made to FIG. 2, which illustrates the outboard portion 112 of the wing 110, along with the winglet 130 (looking generally aft and slightly outboard). The wing 110 includes an upper surface 126 that extends between the inboard and outboard portions 111 and 112 in a spanwise direction. The upper surface 126 extends in a chordwise direction 114 between a wing leading edge 115 and a wing trailing edge 116.

At the outboard portion 112, the wing 110 includes a wing/winglet junction 117 at which the wing 110 transitions to the winglet 130. In a particular embodiment, the junction 117 may be generally curved and/or gradual to reduce flow interference effects between the wing 110 and the winglet 130. In other embodiments, the junction 117 may have other shapes and/or configurations, including a sharp corner and/or a tight radius corner. As used herein, the term sharp corner refers to a corner that includes a surface discontinuity and/or sudden change in shape, e.g., a non-gradual change in slope. In any of these embodiments, the winglet 130 includes an inboard surface 131 and an outboard surface 132. The winglet 130 extends away from the wing 110 along a winglet spanwise axis 133, and extends fore and aft along a winglet chordwise axis 134.

The inboard surface 131 of the winglet 130 has a recess 150 that is sized and located to reduce flow interference effects at the junction 117 of the wing 110 and the winglet 130. The flow interference effects may be reduced partially or fully (that is, eliminated). Flow interference effects may include separated flow at the wing/winglet junction 117. The recess 150 can reduce the flow separation and thereby improve aerodynamic performance.

The recess 150 can also reduce the likelihood of a double-shock" pressure field in the region of the junction 117. In particular, the recess 150 can reduce the aerodynamic compression in the region of the junction 117 to reduce such a shock pattern. This, in turn, can reduce aircraft drag and improve the high-speed buffet margin of the wing 110. In general, it is expected that the tighter the corner of the junction 117, the greater the potential benefit of the recess 150.

In some embodiments, the recess 150 is bounded by adjacent regions 151 that are not recessed. Such adjacent regions 151 may include a forward adjacent region 151a, an aft adjacent region 151b, an upper or distal adjacent region 151c and a lower or proximal adjacent region 151d. In some embodiments, the adjacent regions 151 may be convex, in contrast to a concave recess 150.

In general, the recess 150 is near the root of the winglet 130 where the surface is in closer proximity to the wing 110. As the winglet spanwise distance from the root increases, the need for the recess 150 is reduced. In a spanwise direction, the depth of the recess 150 increases abruptly, flattens and then decreases gradually. For instance, in the winglet chordwise direction, the winglet 130 may include a convex region, then a concave region (the recess), and then another convex region.

In the embodiment illustrated in FIG. 2, the recess 150 is roughly bounded by four points 152, including a forward-most point 152*a*, an aft-most point 152*b*, an uppermost or distal point 152*c*, and a lowermost or proximal point 152*d*. In some embodiments, the location of the forward-most point 152*a* may range from about 20% to about 40% of the local chord length of the winglet 130, and the location of the aft-most point 152*b* can range from about 45% to about 65% of the local chord length. In a particular embodiment, the recess 150 extends from about 25% of the local chord length to about 65% of the local chord length over its spanwise dimension. The location of the uppermost point 152*c* may range from about 20% to about 40% (e.g., about 30%) of the spanwise dimension of the winglet 130, and the location of the lower-most point 152*d* may range from about 0% to about 20% of the spanwise dimension of the winglet. These locations are a function of the orientation of the winglet 130 relative to the wing 110, and/or other design and/or operation features.

In the embodiment illustrated in FIG. 2, the recess 150 is generally pear-shaped. Accordingly, the chordwise extent of the recess 150 may decrease in an upward/outward direction along the winglet spanwise axis 133. In other embodiments, the recess 150 may have other shapes and/or boundaries.

Figure 3:
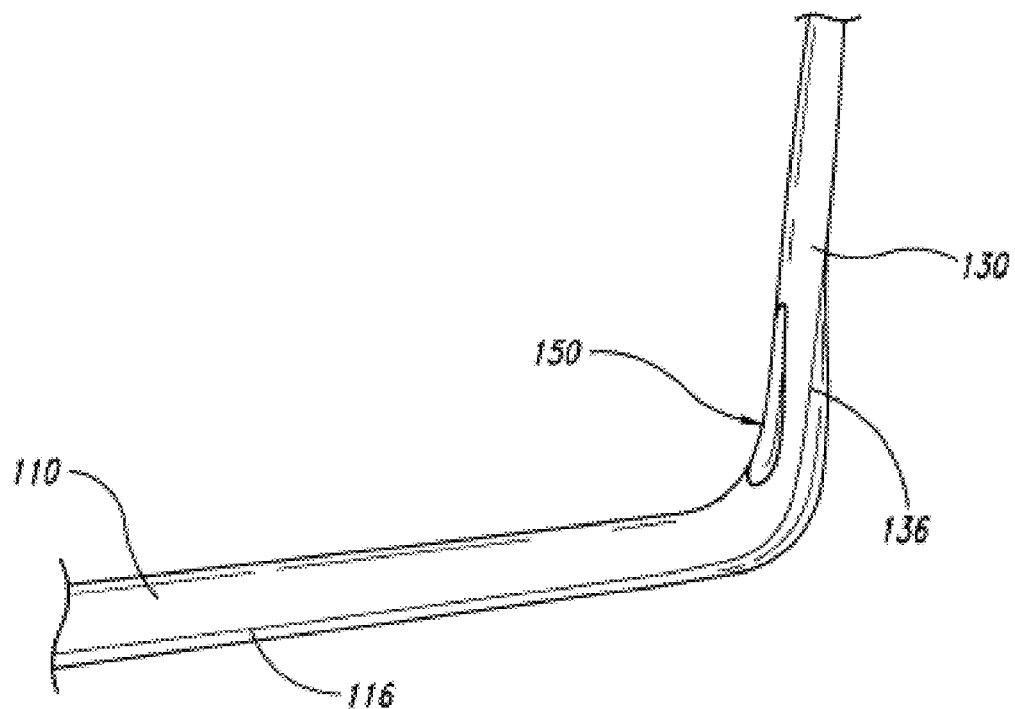
FIG. 3 is a rear-view illustration (looking forward) of a portion of the wing and winglet shown in FIG. 2.
Figure 4:
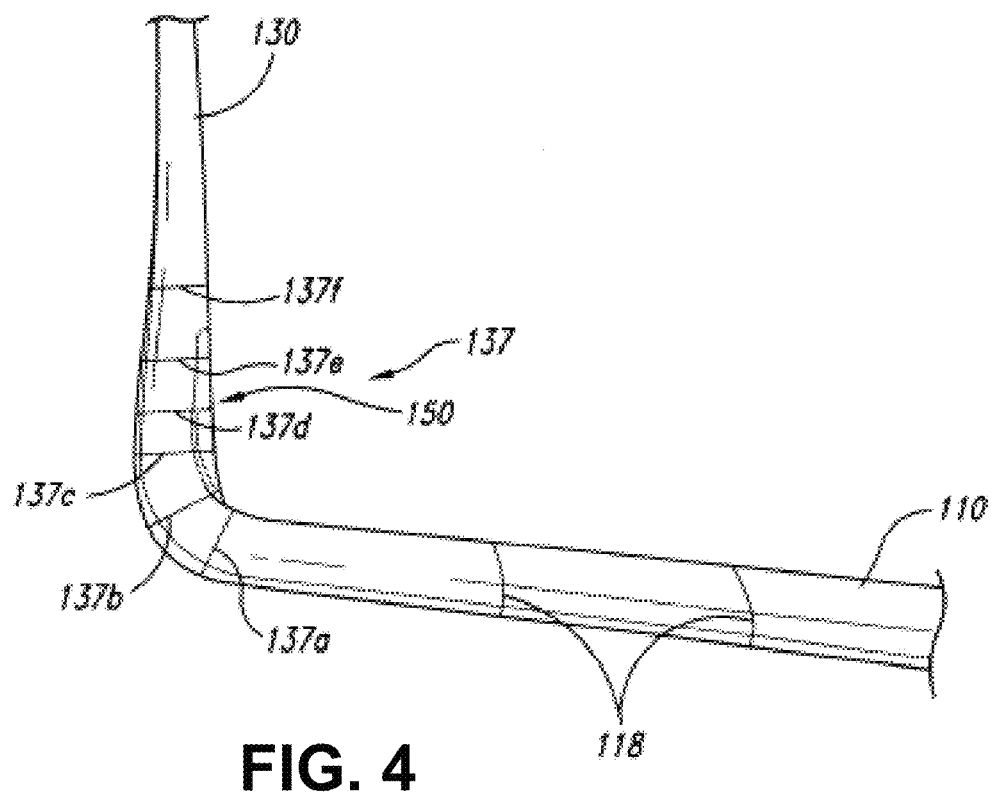
FIG. 4 is a front view illustration (looking rearward) of a portion of the wing and winglet shown in FIG. 2, with particular winglet sections identified.
Figure 5F:
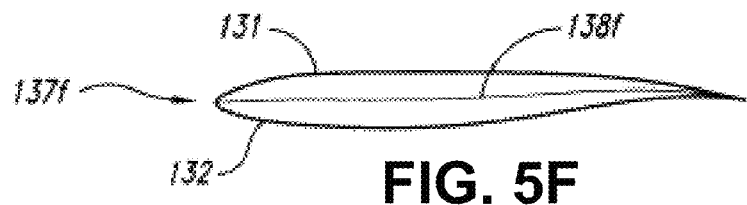
FIGS. 5A-5F are nondimensionalized, cross-sectional illustrations of the winglet sections identified in FIG. 4.
Figure 5E:
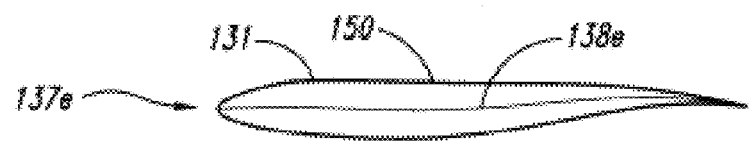
Figure 5D:
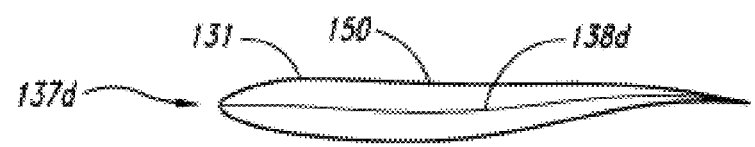
Figure 5C:
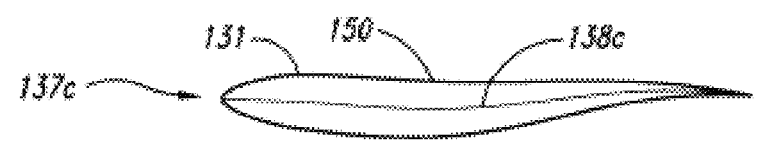
Figure 5B:
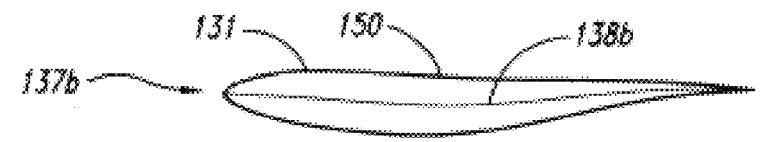
Figure 5A:
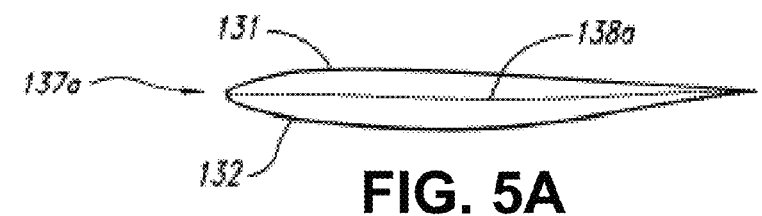

Additional reference is made to FIGS. 3 and 4. FIG. 3 illustrates a rear view (looking forward) of a portion of the wing 110 and the winglet 130 shown in FIG. 2. FIG. 3 accordingly illustrates the recess 150 from the rear, indicating the overall shape of the recess 150 and its location relative to both the winglet 130 (including the winglet trailing edge 136) and the wing 110.

FIG. 4 illustrates a front view (looking rearward) of the wing 110 and the winglet 130 shown in FIGS. 2 and 3. FIG. 4 also indicates representative wing sections 118, and representative winglet sections 137 (shown as first-sixth winglet sections 137*a*-137*f*). The first winglet section 137*a* is taken at a region positioned downward/inboard from the recess 150, and the sixth winglet section 137*f* is taken at a location that is above/outboard of the recess 150. The intermediate winglet sections 137*b*-137*e* intersect the recess 150.

Reference is now made to FIGS. 5A-5F, which illustrate the winglet chord sections 137*a*-137*f* that bracket the recess 150. The leading edge portions of the winglet chord sections 137*a*-137*f* are illustrated with a representative contour that may be different in different embodiments. Each winglet chord section 137*a*-137*f* includes a camber line 138, illustrated as corresponding first-sixth camber lines 138*a*-138*f*. As shown in FIGS. 5A-5F, the camber distribution for each chordwise section is non-monotonic, and the chordwise camber distribution varies in a non-monotonic manner along the spanwise axis of the winglet 130 in the recess 150. For the recess 150 illustrated in FIGS. 1-4, the camber line is generally flat below/inboard of the recess 150 (see camber line 138*a*), becomes concave or more concave in the recess 150 (see camber lines 138*b*-138*e*), and then becomes generally flat or less concave at a distal spanwise location above/outboard of the recess 150 (see camber line 138*f*). The inboard surface 131 of the winglet 130 has a similar, non-monotonic variation as the sections progress in a distal direction along the spanwise axis. Accordingly, as used herein, the term non-monotonic is used to describe a variation that changes in sense or direction, e.g., a contour that initially becomes more concave and then becomes less concave.

Figure 6:
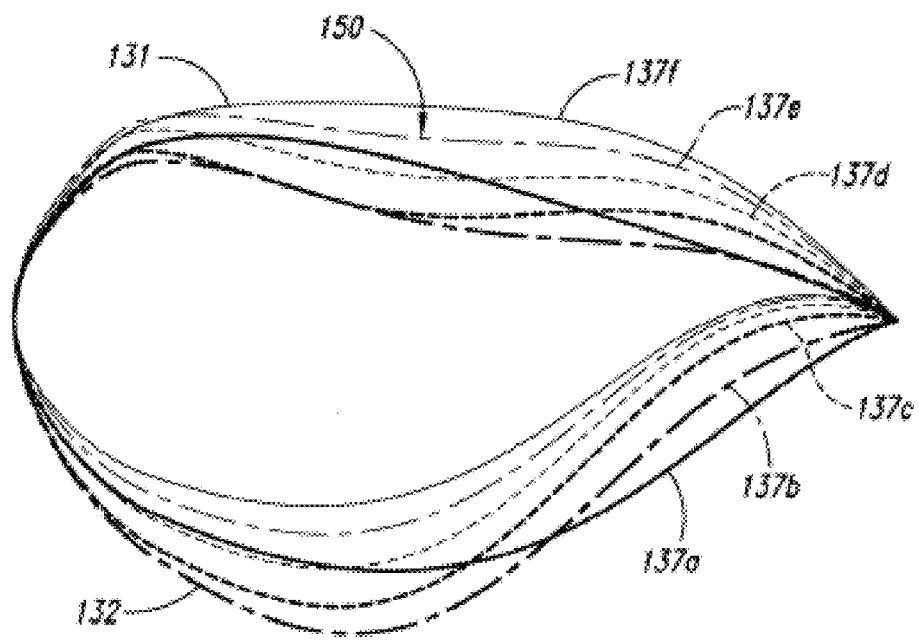
FIG. 6 is a composite illustration of the winglet sections shown in FIGS. 5A-5F, with the vertical scale exaggerated for purposes of illustration.

FIG. 6 illustrates the six winglet sections 137*a*-137*f* together, with the vertical scale exaggerated to highlight the presence of the recess 150.

Figure 7:
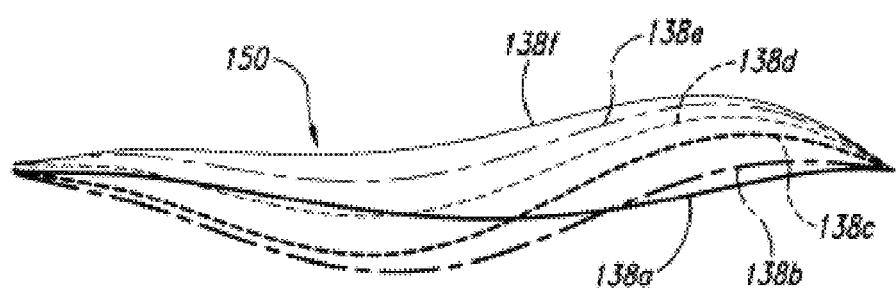
FIG. 7 is a composite illustration of winglet camber lines shown in FIGS. 5A-5F, with the vertical scale exaggerated for purposes of illustration.

FIG. 7 illustrates the six camber lines 138*a*-138*f* together to indicate the variation of the camber lines in the recess 150. FIG. 6 illustrates the non-monotonic change in shape of the winglet first surface 131 in the recess 150 (see chord sections 137*a*-137*f*), and FIG. 7 illustrates the corresponding non-monotonic change in shape of the camber lines 138*a*-138*f* in the recess 150.

A winglet herein may have a different cant angle, different spanwise and/or chordwise extent, and different configuration than the winglet 130 illustrated in FIGS. 1-4. The recess may have a different location and/or extent depending upon the particular installation.

For instance, FIGS. 1-4 show, in general, in the recess 150, the chordwise curvature is one sign, then reverses sign, and then goes back to the original sign (e.g., convex, concave, and then convex again). However, depending on how the winglet 130 is positioned relative to the wing 110 and details of the wing camber, this recess 150 could be positioned further forward or further aft such that it could potentially be just convex then concave, or concave and then convex.

A winglet herein is not limited to a single recess. In some embodiments, there may be more than one recess per winglet. For instance, multiple recesses may be used on multi-surface winglet designs and full-loop (spiroid) designs.

FIGS. 1-4 illustrate an up-winglet topology. However, a wing and wing tip device herein are not so limited. Other topologies and wing tip devices include, but are not limited to, up-down winglets, feathered winglets, wingtip fences, blended winglets, non-planar raked tips, spiroids and other wing-tip devices that extend from a wing in a non-planar fashion, thus causing some amount of geometric junction between the wing and the wing-tip device.

Figure 10:
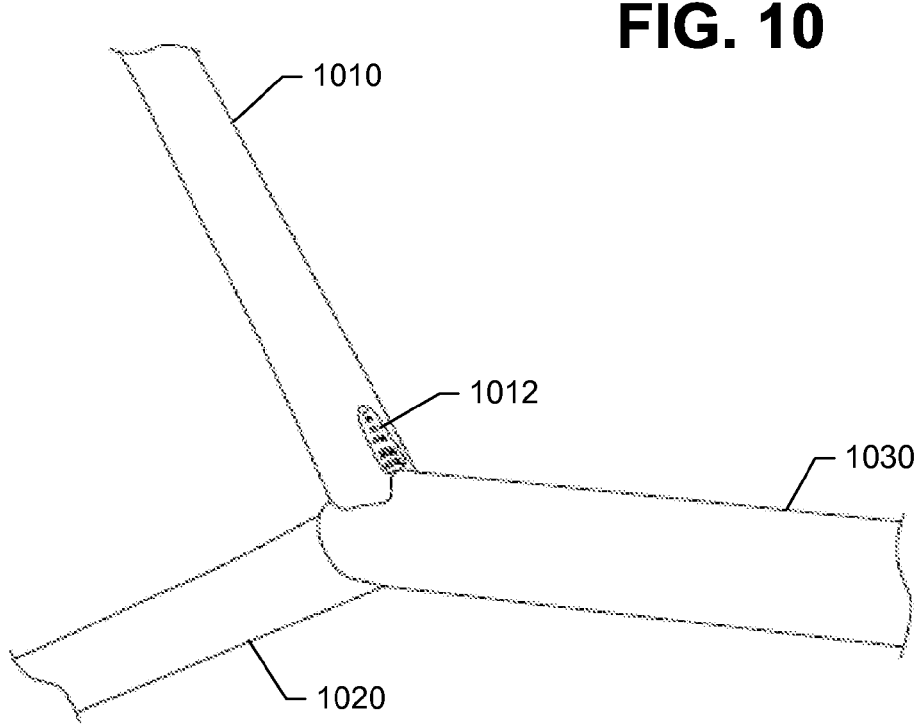
FIGS. 10-12 are illustrations of other embodiments of wing-wing tip device topologies.
Figure 11:
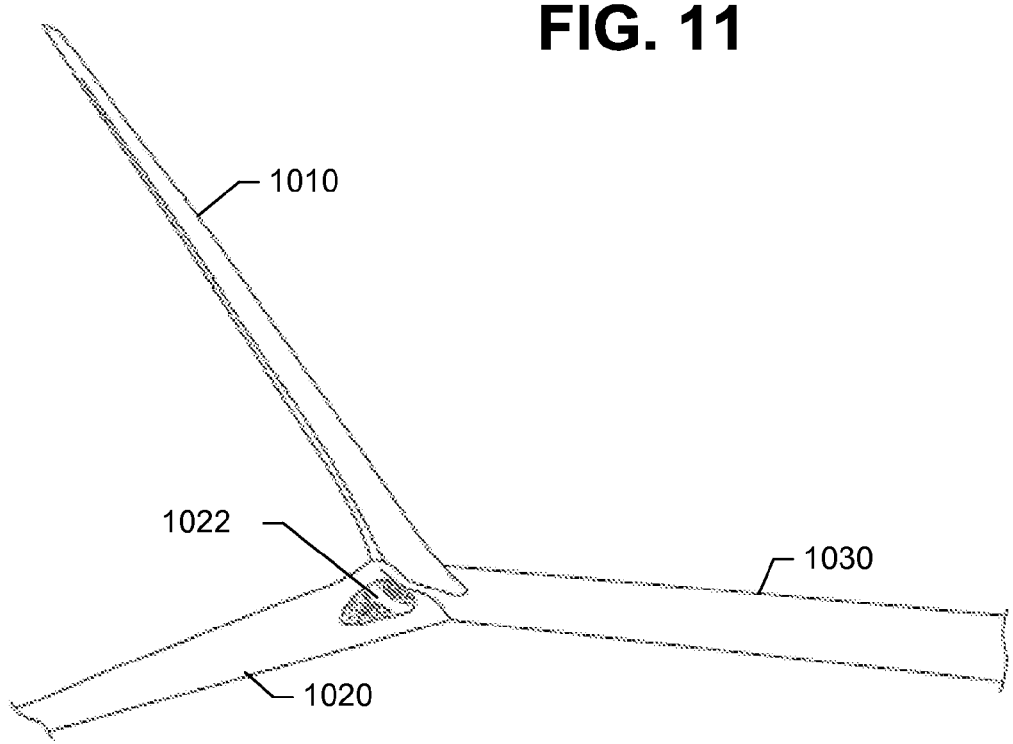

Reference is made to FIGS. 10 and 11, which illustrate an up-down winglet topology. First (up) and second (down) winglets 1010 and 1020 extend from outboard ends of a wing 1030. A first recess, generally at 1012, is located in an inboard surface of the up winglet 1010. A second recess, generally at 1022, is located in an outboard surface of the down winglet 1020. In some embodiments, the up winglet 1010 has a recess 1012, but the down winglet 1020 does not have a recess.

Figure 12:
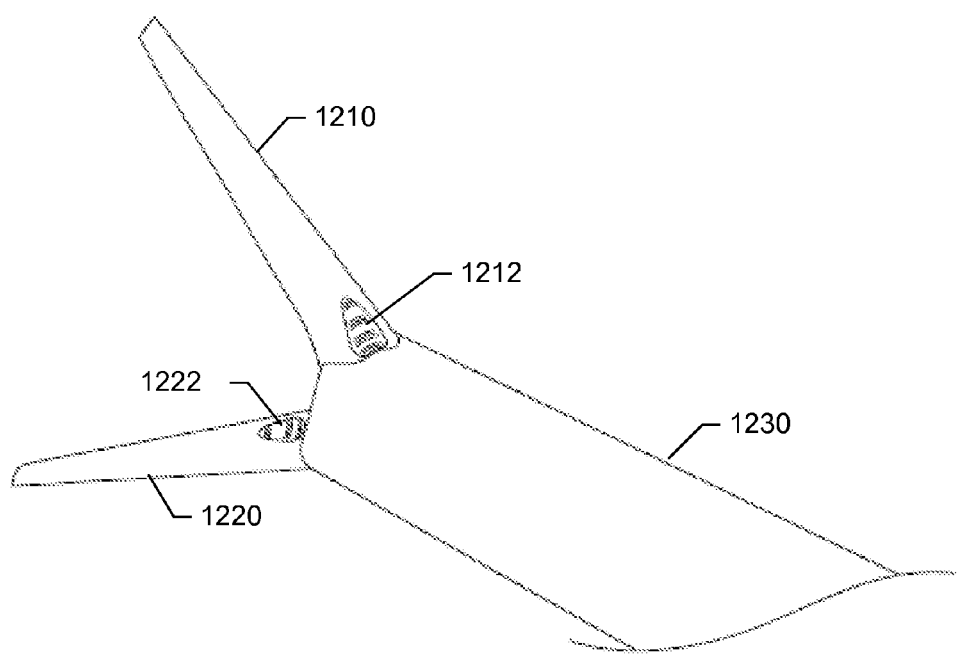

Reference is made to FIG. 12, which illustrates a staggered feathered winglet topology. First (up) and second (down) winglets 1210 and 1220 extend from an outboard end of a wing 1230. The winglets (or feathers) 1210 and 1220 have shorter chords (than the winglets 1010 and 1020) and they are in a staggered configuration. The inboard surface of the up winglet 1210 has a recess indicated generally at 1212, and the outboard surface of the down winglet 1220 has a recess indicated generally at 1222. In some embodiments, the up winglet 1210 has the recess 1012, but the down winglet 1220 does not have a recess.

A winglet herein is not limited to any particular winglet angle. In some embodiments, a winglet herein may be vertical, while in other embodiments, a winglet herein may be canted from the vertical.

An aerodynamic lift structure herein is not limited to a wing. In other embodiments, an aerodynamic lift structure may include a horizontal stabilizer or a forward-wing or canard to reduce the aerodynamic drag on the canard. In further embodiments, a winglet herein may be combined with other lift surfaces such as horizontal span extensions and aft-swept span extensions that are canted upward or downward at various angles.

Figure 8:
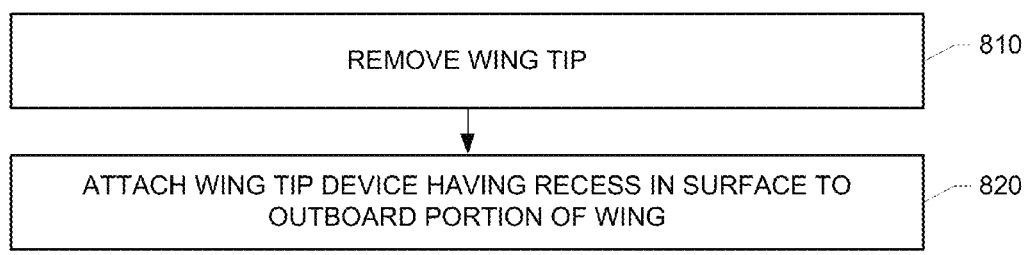
FIG. 8 is an illustration of a method of adding a wing tip device to an aircraft wing.

Reference is now made to FIG. 8, which illustrates a method of retrofitting an aircraft. At block 810, a wing tip is removed. At block 820, at least one wing tip device having a recess is attached to the outboard section of the wing. The winglet may be attached by the aircraft manufacturer or a third party supplier.

In this method, the recess is applied to the winglet without affecting the wing upper surface. In particular, the wing upper surface need not include a flat region or a concave or recess to provide the foregoing aerodynamic advantages, because it is expected that the recess will be at least adequate to do so.

Figure 9:
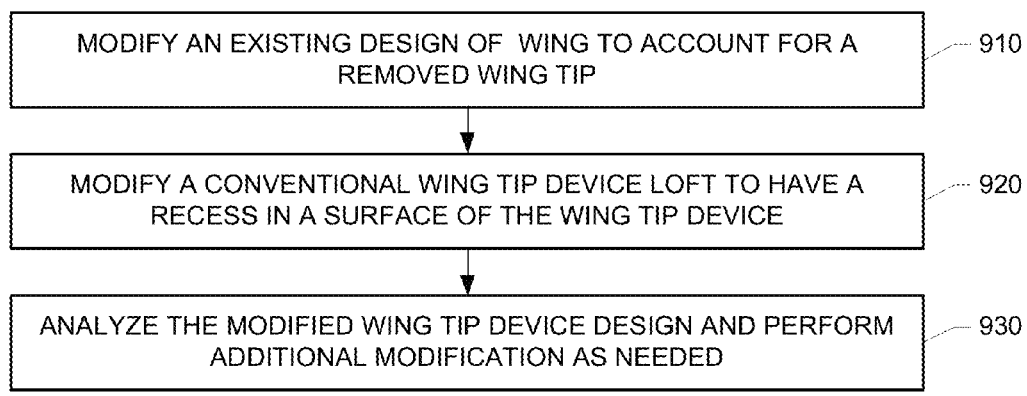
FIG. 9 is an illustration of a method of designing a wing tip device.

Reference is now made to FIG. 9, which illustrates a method of designing a wing tip device for an existing aircraft wing. The method includes modifying an existing design of the wing to account for the removed wing tip (block 910). The method further includes designing the wing tip device for use with the wing, including modifying a conventional wing tip device loft to have a recess in a surface of the wing tip device (block 920). The recess may be defined by a variety of methods, e.g., by altering the lines of an existing airfoil section in the recess, and/or by altering the lines of an existing airfoil section outside the recess (e.g., by "building up" regions outside the recess).

The loft may be analyzed to determine whether it meets target performance levels (block 930). For example, the loft may be assessed using computational fluid dynamics (CFD) tools and/or wind tunnel testing to determine whether preselected target performance levels are met. If not, the initially developed loft may be revised (process portion) until performance levels are met, at which point the process can end.

Wing tip devices herein are not limited to the subsonic commercial aircraft 100 shown in FIG. 1. Wing tip devices herein may be used with military aircraft and other aircraft, both subsonic and supersonic.

The invention claimed is:

1. An aerodynamic lift structure comprising a wing and first and second wing tip devices at an outboard portion of the wing in an up-down topology, a surface of at least one of the wing tip devices having a convex region and a concave region in a chordwise direction, the concave region forming a recess that reduces flow interference effects at a junction of the wing and the wing tip device.

2. The structure of claim 1, wherein the convex region is aft of the concave region; and wherein the surface further includes a convex region fore of the concave region.

3. The structure of claim 1, wherein the first wing tip device is an up winglet having a convex portion and a concave portion that forms a recess in its inboard surface; and wherein the second wing tip device is a down winglet having a convex portion and a concave portion that forms a recess in its outboard surface.

4. The structure of claim 1, wherein the first and second wing tip devices have a staggered feathered winglet topology.

5. The structure of claim 1, wherein camber distribution for each chordwise section of the at least one wing tip device is non-monotonic, and the chordwise camber distribution varies in a non-monotonic manner along the spanwise axis of the wing tip device in the recess.

6. The structure of claim 1, wherein a camber of the at least one wing tip device starts more positive near the junction, then moves more negative through the recess, and then more positive spanwise.

7. The structure of claim 1, wherein the recess is bounded by (a) a first point that is about 20% to about 40% of local chord length; (b) a second point that is about 45% to about 65% of the local chord length; (c) a third point that is about 20% to about 40% of spanwise dimension; and (d) a fourth point that is about 0% to 20% of the spanwise dimension.

8. The structure of claim 7, wherein the first point is about 25% of the local chord length; and the second point is about 65% of the local chord length.

9. The structure of claim 1, wherein the junction is sharp-cornered.

10. A method comprising removing a tip of an aircraft wing; and fastening an up wing tip device and a down wing tip device to an outboard portion of the wing, a surface of at least one of the wing tip devices having a convex region and a concave region forming a recess that reduces flow interference effects at a junction of the wing and the wing tip device.

11. The method of claim 10, wherein a camber of the at least one wing tip device starts more positive near the root, then moves more negative through the recess, and then more positive spanwise.

12. The method of claim 10, wherein the recess is bounded by (a) a first point that is about 20% to about 40% of local chord length; (b) a second point that is about 45% to about 65% of the local chord length; (c) a third point that is about 20% to about 40% of spanwise dimension; and (d) a fourth point that is about 0% to 20% of the spanwise dimension.

13. The method of claim 12, wherein the first point is about 25% of the local chord length; and the second point is about 65% of the local chord length.

14. The method of claim 10, wherein the convex region is aft of the concave region; and wherein the surface further includes a convex region fore of the concave region.

15. The method of claim 10, wherein the up wing tip device has the recess in its inboard surface; and wherein the down wing tip device has the recess in its outboard surface.

16. The method of claim 10, wherein the first and second wing tip devices are winglets fastened in a staggered feathered winglet topology.

* * * * *